United States Patent
Malmgren

(10) Patent No.: US 10,118,368 B2
(45) Date of Patent: Nov. 6, 2018

(54) INTERMEDIATE LAMINATE PRODUCT, AN EXPANDED LAMINATE STRUCTURE, AND PROCESS MANUFACTURING THEREOF

(71) Applicant: SCA Forest Products AB, Sundsvall (SE)

(72) Inventor: Kent Malmgren, Sundsvall (SE)

(73) Assignee: SCA FOREST PRODUCTS AB, Sundsvall (SE)

( * ) Notice: Subject to any disclaimer, the term of this patent is extended or adjusted under 35 U.S.C. 154(b) by 0 days.

(21) Appl. No.: 15/524,061

(22) PCT Filed: Nov. 4, 2014

(86) PCT No.: PCT/SE2014/051302
§ 371 (c)(1),
(2) Date: May 3, 2017

(87) PCT Pub. No.: WO2016/072888
PCT Pub. Date: May 12, 2016

(65) Prior Publication Data
US 2017/0361573 A1   Dec. 21, 2017

(51) Int. Cl.
| | |
|---|---|
| *D21H 27/10* | (2006.01) |
| *B32B 15/12* | (2006.01) |
| *D21H 19/12* | (2006.01) |
| *D21H 27/32* | (2006.01) |
| *D21H 23/22* | (2006.01) |
| *C09D 103/02* | (2006.01) |
| *B32B 15/20* | (2006.01) |
| *B32B 27/10* | (2006.01) |
| *B32B 27/30* | (2006.01) |
| *B32B 29/00* | (2006.01) |
| *B65D 65/40* | (2006.01) |

(52) U.S. Cl.
CPC .............. *B32B 15/12* (2013.01); *B32B 15/20* (2013.01); *B32B 27/10* (2013.01); *B32B 27/306* (2013.01); *B32B 29/005* (2013.01); *B65D 65/40* (2013.01); *C09D 103/02* (2013.01); *D21H 19/12* (2013.01); *D21H 23/22* (2013.01); *D21H 27/10* (2013.01); *D21H 27/32* (2013.01); *B32B 2255/12* (2013.01); *B32B 2255/26* (2013.01); *B32B 2307/54* (2013.01); *B32B 2307/718* (2013.01); *B32B 2307/72* (2013.01); *B32B 2307/7244* (2013.01); *B32B 2307/7265* (2013.01); *B32B 2553/00* (2013.01)

(58) Field of Classification Search
CPC ......... B32B 15/12; B32B 15/20; B32B 27/10; B32B 27/306; B32B 29/005; B65D 65/40; C09D 103/02; D21H 19/12; D21H 23/22; D21H 27/10; D21H 27/32
USPC ......................................................... 428/535
See application file for complete search history.

(56) References Cited

U.S. PATENT DOCUMENTS

| | | | | |
|---|---|---|---|---|
| 2003/0152724 A1* | 8/2003 | Swoboda | ............... | B65D 65/42 428/34.2 |
| 2007/0208093 A1* | 9/2007 | Nordin | ..................... | B01J 13/14 521/56 |
| 2008/0171482 A1* | 7/2008 | Weber | .................. | C08K 5/0008 442/76 |
| 2012/0048450 A1* | 3/2012 | Fu | ........................... | B29C 35/10 156/83 |
| 2014/0087109 A1* | 3/2014 | Huang | ..................... | C09J 11/08 428/36.5 |
| 2014/0238586 A1* | 8/2014 | Huang | ................... | C09J 103/02 156/210 |

FOREIGN PATENT DOCUMENTS

| | | | |
|---|---|---|---|
| DE | 20117662 U1 | | 2/2002 |
| FR | 2188611 | * | 1/1974 |
| FR | 2188611 A5 | | 1/1974 |
| JP | 2008-266799 A | | 11/2008 |
| JP | 2008266799 | * | 11/2008 |
| WO | WO-00/00408 A1 | | 1/2000 |
| WO | WO00/30846 | * | 6/2000 |
| WO | WO-00/30846 A1 | | 6/2000 |
| WO | WO2006/068574 | * | 6/2006 |
| WO | WO-2006/068574 A1 | | 6/2006 |

(Continued)

OTHER PUBLICATIONS

Extended European search report dated Jun. 1, 2018 issued in corresponding European patent application No. 14905269.8.

*Primary Examiner* — Leszek B Kiliman

(74) *Attorney, Agent, or Firm* — Drinker Biddle & Reath LLP

(57) ABSTRACT

An intermediate laminate product includes a first paper layer including lignocellulose fibers, and a dry coating layer applied to one surface of the first paper layer, the coating including expandable microspheres having an expansion temperature ($T_E$), at least one polysaccharide, and a plasticizing additive which is capable of forming a thermoplastic blend with the polysaccharide. An expanded laminate structure includes the intermediate laminate product and a second paper layer comprising lignocellulose fibers, which is attached to the dry coating by heat lamination. A liquid packaging board includes the expanded laminate structure and a liquid barrier layer. A process for forming the expanded laminate structure includes applying a second paper layer to the coating of the intermediate product at a second temperature (T2), which is above the expansion temperature ($T_E$) of the microspheres, whereby the microspheres expand, and at which the plasticizing additive causes plasticizing of the polysaccharide, to form a thermoplastic blend.

20 Claims, 3 Drawing Sheets

(56) References Cited

FOREIGN PATENT DOCUMENTS

| | | |
|---|---|---|
| WO | WO-2007/142593 A1 | 12/2007 |
| WO | WO-2008/066487 A1 | 6/2008 |
| WO | WO-2014/051876 A1 | 4/2014 |
| WO | WO2014/175792 * | 10/2014 |
| WO | WO-2014/175792 A1 | 10/2014 |

* cited by examiner

INTERMEDIATE LAMINATE PRODUCT, AN EXPANDED LAMINATE STRUCTURE, AND PROCESS MANUFACTURING THEREOF

CROSS-REFERENCE TO PRIOR APPLICATION

This application is a § 371 National Stage Application of PCT International Application No. PCT/SE2014/051302 filed Nov. 4, 2014, which is incorporated herein in its entirety.

TECHNICAL FIELD

The present disclosure relates to an intermediate laminate product, an expanded laminate structure including the intermediate laminate product, a packaging board including the expanded laminate structure, a process for forming the intermediate laminate product, and a process for forming the expanded laminate structure.

BACKGROUND

Expandable laminates may be used in many areas, for example to replace corrugated board and paper board in various applications. Expandable laminates normally include an expandable material and a web or layer supporting the expandable material on one or both sides. Such expandable laminates, having a low density intermediate layer and supporting surface layers with high E-modulus, lead to materials which are flexurally rigid, and have low weight, which means that the laminates are not bulky during transport, but can be made flexurally rigid by expansion at the final destination. Examples of heat-expandable laminates are disclosed in DE20117662U1 and WO00/00408A1.

There is a need for thin and durable laminates. Specifically, it is desired to provide an improved expandable intermediate laminate, and to expand laminate structures including the intermediate laminate, and also to provide efficient processes for their production.

SUMMARY

The present disclosure relates to an intermediate laminate product, including a first paper layer including lignocellulose fibres, and a dry coating layer applied to one surface of the first paper layer, said intermediate laminate product being intended for heat lamination with a second paper layer including lignocellulose fibres, the coating including expandable microspheres, said microspheres having an expansion temperature ($T_E$), at least one polysaccharide, and a plasticizing additive which is capable of forming a thermoplastic blend with the polysaccharide. The microspheres can have an expansion temperature ($T_E$) of 120-230° C. The polysaccharide is advantageously a native or modified starch, for example a modified starch having reduced viscosity after gelatinisation as compared to native starch, and the plasticizing additive is chosen from one or more of urea, glycerol, citric acid, formamide, acetamide, sorbitol or glycol, for example a combination of urea and glycerol. The coating of the intermediate laminate product may include 1-25 wt-% of one or more polymer compounds. The polymer compounds may be chosen from the group consisting of styrene-butadiene polymers, acrylonitrile-butadiene polymers and vinyl acetate-ethylene polymers styrene-butylacrylate polymers, polyvinyl-acetate polymers, polyhydroxy alkanoate polymers, nitrile polymers, and natural rubber. Further, the coating may advantageously include 2-50 wt-%, 5-30 wt-%, or 7-20 wt % of expandable microspheres, based on the dry weight of the coating. The coating may include 30-93 wt-% of polysaccharide, based on the dry weight of the coating, and 5-30 wt-% of the plasticizing additive, based on the dry weight of the coating. In particular embodiments, the coating of the intermediate laminate product includes, based on the dry weight of the coating, 7-20 wt-% of expandable microspheres, 40-75 wt-% of starch, 5-10 wt-% of urea, 5-10 wt-% of glycerol, and 5-20 wt-% of latex.

The present disclosure also relates to an expanded laminate structure including the above mentioned intermediate laminate product, and further including a second paper layer including lignocellulose fibres, which is attached to the dry coating by means of heat lamination. A particularly useful application of the expanded laminate structure is a liquid packaging board including the expanded laminate structure, and further including a liquid barrier layer on at least one of said first or second paper layers.

The present disclosure also relates to a process for forming the above mentioned intermediate laminate product, including the steps: applying a coating to a first paper layer, which coating includes an aqueous mixture of polysaccharide, a plasticizing additive which is capable of forming a thermoplastic blend with the polysaccharide, and expandable microspheres, said microspheres having an expansion temperature ($T_E$), and optionally a latex dispersion, said latex dispersion possibly including polymer compounds chosen from the group consisting of styrene-butadiene polymers, acrylonitrile-butadiene polymers and vinyl acetate-ethylene polymers styrene-butylacrylate polymers, polyvinyl-acetate polymers, polyhydroxy alkanoate polymers, nitrile polymers, and natural rubber; drying the coated paper layer at a first temperature ($T_1$) below the expansion temperature ($T_E$) of the microspheres, whereby a dry intermediate laminate product is obtained; and packing the dry intermediate laminate product for transport or storage, or transferring it directly to a lamination step for lamination with a second paper layer. Said first temperature ($T_1$) may be 80-110° C. The coating is suitably applied in an amount of 5-200 g/m².

The present disclosure also relates to a process for forming the above mentioned expanded laminate structure, including the steps of the above mentioned process for forming the intermediate laminate product, or providing a previously manufactured intermediate laminate as mentioned above, and further including: introducing the intermediate laminate product into a heat lamination step; and applying a second paper layer to the coating of the intermediate product at a second temperature ($T_2$), which is above the expansion temperature ($T_E$) of the microspheres, whereby the microspheres expand, and at which the plasticizing additive causes plasticizing of the polysaccharide, to form a thermoplastic blend. Said second temperature ($T_2$) may be 120-200° C., or 130-180° C.

The disclosure also relates to an expanded laminate structure including the above described intermediate laminate product, including a barrier layer of plastic or metal sheet material positioned between two layers of intermediate laminate product, in which the coating layers are in expanded form, and wherein the two layers of intermediate laminate product are oriented in the laminate such that the expanded coating of each layer is turned towards the barrier layer. The barrier layer is advantageously made from an oxygen-barrier material, for example polyethylene-vinylalcohol film or aluminium film. This expanded laminate structure may further include a liquid barrier layer on at least one of said first or second paper layers, on the side of the second paper layer facing away from the coating layer.

The disclosure also relates to a process for forming the expanded laminate structure including the barrier layer including the steps of the above mentioned process for forming the intermediate laminate product, or providing a previously manufactured intermediate laminate as mentioned above, and further including: introducing a first layer of intermediate laminate product into a heat lamination step; applying a barrier layer of plastic or metal sheet material to the coating of the first layer of intermediate laminate product; and applying a second layer of intermediate laminate product to the barrier layer, such that the coating layer of the second layer of intermediate laminate product is turned towards the barrier layer; and subjecting said layers to a second temperature (T2), which is above the expansion temperature (TE) of the microspheres, whereby the microspheres expand, and at which the plasticizing additive causes plasticizing of the polysaccharide, to form a thermoplastic blend.

The disclosure also relates to use of the expanded laminate structures described above as a packaging board for manufacture of a package.

DETAILED DESCRIPTION OF PARTICULAR EMBODIMENTS

Figure 1:
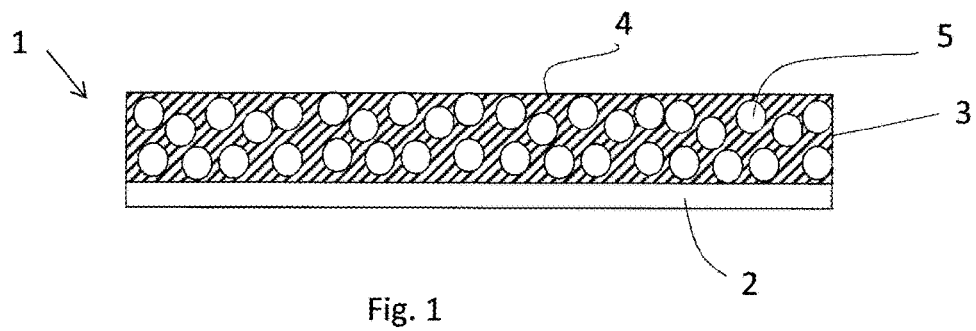
FIG. 1 is a schematic cross-sectional view of an intermediate laminate product of an embodiment of the invention.

The disclosure relates to an expandable intermediate laminate product, which is intended for heat lamination with a second paper layer including lignocellulose fibres in the manufacture of an expanded laminate structure. The intermediate laminate product includes a first paper layer and dry coating layer. By a dry coating layer is meant, in this context, a layer having a humidity which is in equilibrium with the humidity of the ambient air. The paper layer is a lignocellulose fibre containing web. All known lignocellulose fibre containing paper-grades can be used, for example sack paper, kraft liner, test liner, white top liner, grease proof paper, uncoated wood-free printing paper, coated wood-free printing paper, uncoated wood-containing printing paper, coated wood-containing printing paper, kraft paper, machine glazed paper, machine finished paper, smooth finished paper, fluting, tissue paper, carton board, or grey board.

The dry coating layer includes expandable microspheres and components beings capable of forming a thermoplastic blend upon heating, so as to be able to function as a thermoplastic binding agent for the microspheres and the paper layers in an expanded laminate structure made from the intermediate laminate product. The coating layer includes unexpanded expandable material in the form of expandable microspheres, and binding components including at least one polysaccharide, and a plasticizing additive which is capable of forming a thermoplastic blend with the polysaccharide, and optionally polymer compounds as described below. If desired, the coating may optionally also contain special additives such as hydrophobation agents, crosslikers or nano/micro fibers.

The disclosure also relates to an expanded laminate structure, which includes the intermediate laminate product, and further includes a second paper layer including lignocellulose fibres attached to the dry coating by means of heat lamination. In the expanded laminate structure, the coating layer of the intermediate laminate product is expanded and forms an intermediate expanded layer between the first and second paper layers. Instead of a second paper layer other material can be used, such as plastic films, metal films, nonwoven materials or textile materials, as long as the materials used can withstand the temperature of the heat lamination step.

The disclosure further relates to a liquid packaging board including the above mentioned expanded laminate structure and further including a liquid barrier layer on at least one of said first or second paper layers. The liquid barrier layer can be coated or laminated to the paper layers prior to the manufacture of the intermediate laminate product, at the same time or subsequent to laminating the second paper layer to the intermediate laminate product. The barrier layer may be a wax layer, a metal film, such as an aluminium film, or a plastic film, such as polyethylene and polyester films, laminated to the first and/or second paper layer.

The above mentioned intermediate laminate product can be manufactured by means of a process described below. In the process a first paper layer is introduced into a coating equipment, followed by applying a coating layer to the first paper layer, which coating includes an aqueous mixture of polysaccharide, a plasticizing additive which is capable of forming a thermoplastic blend with the polysaccharide, and expandable microspheres having an expansion temperature ($T_E$), and optionally a latex dispersion. If desired the coating may be free from latex polymers. Thereafter, the coated paper layer is dried at a first temperature ($T_1$) below the expansion temperature ($T_E$) of the microspheres, whereby a dry intermediate laminate product is obtained. The first temperature ($T_1$) refers to the temperature in the paper layer and the applied coating during the drying process, thus the temperature in the drying equipment can be higher as long as the first temperature ($T_1$), i.e. the temperature in the layers of the intermediate laminate is kept below the expansion temperature ($T_E$).

The dry intermediate laminate product is then packed for transport or storage, or transferring it directly to a lamination step for lamination with a second paper layer. The dry intermediate laminate product does thus not include any layer on the surface of the coating layer which is opposite to the first paper layer.

In the coating step, the coating is applied to a substantially dry paper web, which means that the humidity of the paper is approximately in equilibrium with the humidity of the ambient air. Thus, the expandable coating is not applied during manufacture of the paper itself, but can be applied directly subsequent to paper manufacture, in-line with the paper manufacture process.

The coating, which is applied to the first paper layer, is an aqueous mixture or solution, for example in the form of a paste, including polysaccharide, plasticizing additive, and expandable microspheres. As said above, polymer compounds can optionally be comprised in the coating, and they are then added as a latex dispersion.

When the coated paper layer is dried at the first temperature ($T_1$), the water contained in the coating layer evaporates, but the expandable microspheres do not expand. Thereby, a relatively thin intermediate laminate product is obtained. The dried coating is stable enough to remain on the paper layer, and flexible enough for the coated paper layer to be rolled up for transport or storage. The drying temperature ($T_1$) may be 80-110° C., so that the water of the applied coating can be efficiently removed. The microspheres should accordingly be selected so as to have an expansion temperature ($T_E$) above the chosen drying temperature.

The disclosure also relates to a process for forming the above mentioned expanded laminate structure. In this process, an intermediate laminate product is introduced into a heat lamination step, where a second paper layer is applied to the coating layer on the side of the coating layer which is opposite to the first paper layer. The coating layer of the intermediate laminate product forms an intermediate layer in the resulting mentioned expanded laminate structure. As said above, the coating layer of the intermediate laminate product includes microspheres and binding components, which are components capable of forming a thermoplastic blend upon heating, so as to be able to function as a thermoplastic binding agent for the microspheres and the paper layers in an expanded laminate structure made from the intermediate laminate product. The second paper layer is laminated to the intermediate laminate product at a second temperature ($T_2$), which is above the expansion temperature ($T_E$) of the microspheres to cause expansion thereof, and at which the binding components form a thermoplastic blend. The second temperature ($T_2$) refers to the temperature in the layers to be laminated. In this step, the papers are fused together with the intermediate expanded layer. After lamination, the temperature is reduced and the resulting expanded laminate structure is allowed to cool, binding agent becomes stiffer and stabilises the expanded laminate.

This process can be carried out in direct connection with the process for forming the intermediate laminate product so that the intermediate laminate product is transferred to the heat lamination step directly after the drying step. Alternatively, process for forming the expanded laminate structure can be carried out separately at a later time or at a different geographic location, whereby a pre-manufactured intermediate laminate product is introduced into the heat lamination step.

The lamination may be carried out by positioning a second paper layer onto the surface of the dry coating layer of the intermediate laminate product, and leading the layers between heated cylinders, but also other methods are possible, for example exposing the layers to heated air in an oven. The laminate can optionally include multiple layers, which can be accomplished by laminating three or more papers, where at least two have an expandable coating layer. The structure may also contain additional layers, in particular of liquid barrier material of oxygen barrier material, such as plastic sheets or aluminum sheets, which is beneficial in packaging application. These films can be applied in the lamination/expansion step or be laminated to paper before or after the lamination/expansion step.

Upon heating of the coating layer in the heat lamination step, the plasticizing additive of the coating layer causes plasticizing of the polysaccharide. Polysaccharides have a chemical structure which binds efficiently to the chemical structure of the lignocellulose fibres in the paper layer. Thereby, the polysaccharide improves the bond strength between the paper layers and the expanded coating layer.

In the following, the amounts of the various components of the expandable/expanded layer are defined as weight-% based on the dry weight of the coating. By dry weight of the coating is meant in this context, the total weight of the coating components except water, said components per se having a humidity which is in equilibrium with the humidity of the ambient air. When amounts of polymer compounds added in the form of a latex dispersion, the polymer amount is based on the dry weight of the coating.

The intermediate coating layer may include 30-93 wt-% of polysaccharide, based on the dry weight of the coating, to ensure the strength of the bond between the paper and the intermediate layer.

The paper used as starting material for the first and second paper layers in the intermediate laminate product and the expanded laminated structure can be uncoated on at least the side of the paper which is facing the expandable/expanded coating layer. The lignocellulose fibres of the paper are thereby more easily accessible for bonding to the polysaccharide of the expandable/expanded coating layer, which further increases the bonding strength between the paper layers and the intermediate layer. By uncoated, in this context, is meant that the starting paper material is free from components normally used in paper manufacture in order to improve paper properties such as basis weight, surface gloss, smoothness or printability on the side facing the expandable/expanded intermediate layer. However, the surface of the starting paper material facing away from the expandable/expanded intermediate layer may advantageously be coated with components to improve basis weight, surface gloss, smoothness or printability, such as kaolinite, calcium carbonate, bentonite, talc, chalk, china clay, latex or starch, since this is beneficial for example in packaging applications.

The polysaccharide can be a native or modified starch, which bind especially well to the lignocellulose fibres of the paper layer, thereby further improving the bond between the paper layers and the intermediate layer. In particular embodiments, a modified starch having reduced viscosity after gelatinisation as compared to native starch is used, which allows a larger amount of starch to be blended into the aqueous coating mixture applied to the first paper layer, and at the same time keeps the consistency of the coating paste suitable for spreading onto the paper surface. The applied expandable coating thereby contains less water to be evaporated during the drying step, which is beneficial from an energy consumption point of view. The modified starch can for example be a hydroxypropylated starch, such as Solcoat 55 obtainable from Solam GmbH. Modified starch with reduced viscosity can be obtained in a number of ways known in the art, for example by treating starch or starch granules with inorganic acids (e.g. hydrochloric acid), sodium hydroxide or potassium hydroxide, hydrogen peroxide, sodium hypochlorite, enzymes, phosphorous acid, sodium phosphate, potassium phosphate, or sodium triphosphate, by esterification with for example sodium trimetaphosphate or acetic anhydride, by hydroxypropylation or hydroxyethylation, or by adding positive or negative electrical charge to starch, or combinations thereof.

When exposing the expandable coating layer to heat in the lamination step the plasticizing additive acts on the polysaccharide to give it thermoplastic properties. Thereby, the binding components of the coating bind well to the expanded microspheres, allowing the coating to be applied in a thin layer on the paper layer, and the resulting expanded layer will also be relatively thin. The coating may advantageously be applied in an amount of 5-200 g/m$^2$, corresponding to a thickness of the coating of about 20-40 μm when the coating is in an unexpanded state, and the expanded layer in the final product may typically have a thickness of 0.1-1 mm. When the expanded laminate structure is used as a liquid packaging board, the total thickness of the structure may be 0.3-0.8 mm, which corresponds to an applied expandable layer of 10-50 g/m$^2$.

The plasticizing additive may be any compound known in the art having capability of forming a thermoplastic blend with a polysaccharide. Examples of such compounds can be found in US2012/0157582. The plasticizing additive is preferably may be chosen from one or more of urea, glycerol, citric acid, formamide, acetamide, sorbitol or glycol, and may be present in the coating layer in an amount of 5-30 wt-%, based on the dry weight of the coating. Urea is a plasticizing additive used in certain embodiments, which is solid at room temperature, but reacts with the polysaccharide to plasticize it at the elevated temperature of the heat lamination step. Urea is most effective at temperatures above 130° C. Glycerol is capable of plasticizing at lower temperatures, and may be included in the expandable coating blend in addition to urea, in order to improve softness and reduce brittleness of the unexpanded coating or the expanded intermediate layer. In particular embodiments, urea and glycerol are used in combination.

During the heat lamination step the expandable microspheres expand since the temperature of this step (i.e. second temperature $(T_2)$) is selected to be above the expansion temperature of the microspheres. The microspheres are typically of core/shell type consisting of an exterior of a thermoplastic shell that encapsulates a low boiling point hydrocarbon. Upon heating, the outside shell will soften and expand as the hydrocarbon exerts a pressure on the internal shell wall. Such microspheres may expand to more than 50-60 times their original volume. The temperature $(T_2)$ in the lamination step may be 120-200° C., or 130-180° C. The expandable microspheres may have an expansion temperature $(T_E)$ of 120-230° C., in order to avoid premature expansion during the drying step. An example of suitable expandable microspheres is Expancel DU™, available from AkzoNobel. The expanded or expandable microspheres may be included in an amount of 2-50 wt-%, 5-30 wt-%, or 7-20 wt-% of, based on the dry weight of the coating or the intermediate layer. When the microspheres expand, the thickness of the coating layer is increased. After lamination, the temperature is reduced and the binding agent becomes harder. The expanded laminated structure is then stiffer than the intermediate product due to the increased thickness of the intermediate coating layer, which is firmly bonded to paper layers on each side.

The dry coating of the intermediate laminate product may include 1-25 wt-% of one or more polymer compounds, said polymer compounds possibly being chosen from the group consisting of styrene-butadiene polymers, acrylonitrile-butadiene polymers, and vinyl acetate-ethylene polymers. The polymer compounds are added to the coating mixture in the form of a latex dispersion. The latex polymers contribute to the process and to the resulting intermediate laminate product and expanded laminated structure by making the coating paste easier to apply and giving an even surface to the coating layer.

In a particular embodiment, the coating includes, based on the dry weight of the coating, 7-20 wt-% of expandable microspheres, 40-75 wt-% of starch, 5-10 wt-% of urea, 5-10 wt-% of glycerol, and 5-20 wt-% of styrene-butadiene latex. This composition balances all characteristics of the components. The starch contributes to the bonding of the intermediate layer to the paper layers, the urea plasticizes the starch during heat lamination, so that the expanded microspheres can be well bonded to the starch in the expanded structure also when present in a relatively thin layer. The glycerol reduces brittleness of the expanded structure at room temperature. The latex contributes to the spreading properties of the expandable coating during manufacture of the intermediate laminate product and improves the wet resistance of the laminate, since the latex becomes hydrophobic after drying.

An alternative advantageous expanded laminate includes a barrier layer of plastic or metal sheet material positioned between two layers of the above described intermediate laminate product. The two layers of intermediate laminate product are oriented in the laminate such that the expanded coating of each layer is turned towards the barrier layer. The barrier layer thus forms a middle layer between two layers of expanded coating, which are in turn positioned between paper layers. It has been found that the coating layer attaches well to plastic and metal sheet materials. In particular embodiments, the barrier layer has oxygen-barrier properties, and materials for the barrier layer may be aluminium film or polyethylene-vinylalcohol film. The expanded laminate including a middle barrier layer may also include a liquid barrier layer positioned on at least one of the paper layers on the outward side, facing away from the coating layer.

The expanded laminate structure including a barrier layer can be obtained by a process, including the steps of introducing a first layer of intermediate laminate product into a heat lamination step, applying a barrier layer of plastic or metal sheet material to the coating of the first layer of intermediate laminate product, and applying a second layer of intermediate laminate product to the barrier layer, such that the coating layer of the second layer of intermediate laminate product is turned towards the barrier layer. The thus stacked layers are subjected to a second temperature $(T_2)$, which is above the expansion temperature $(T_E)$ of the microspheres, whereby the microspheres expand, and at which the plasticizing additive causes plasticizing of the polysaccharide, to form a thermoplastic blend. This process may follow directly upon the process for forming the intermediate laminate product, or can be carried out at a different location or a different point in time.

The above described expanded laminates are particularly suitable for the manufacture of packages where the package board is folded along crease lines. Such crease lines can be created in the material by means of a die tool which does not cut through the material, but forms an impressed line along which the material is to be folded. It has been found that when forming crease lines in the above described expanded laminate, the folding of the material can be obtained without any delamination of the material. One reason for this is probably that some of the expanded microspheres are crushed by the die tool during forming of the crease line, whereby the material becomes thinner and somewhat more flexible in the area of the crease line. This advantage applies to all the above described expanded laminates. A major difference compared to carton board is that no delamination is needed to eliminate the rest momentum in a corner of a package. The needed delamination of carton board is a disadvantage as it decreases the strength of the package and may increase edge absorption of liquid. A particularly useful application of the above described expanded laminates is therefore a package blank cut from the expanded laminate, which includes impressed crease lines, and a folded package which has been folded along impressed crease lines. In conventional packaging board delamination is a problem related to the forming of crease lines and folding packages.

Figure 2:
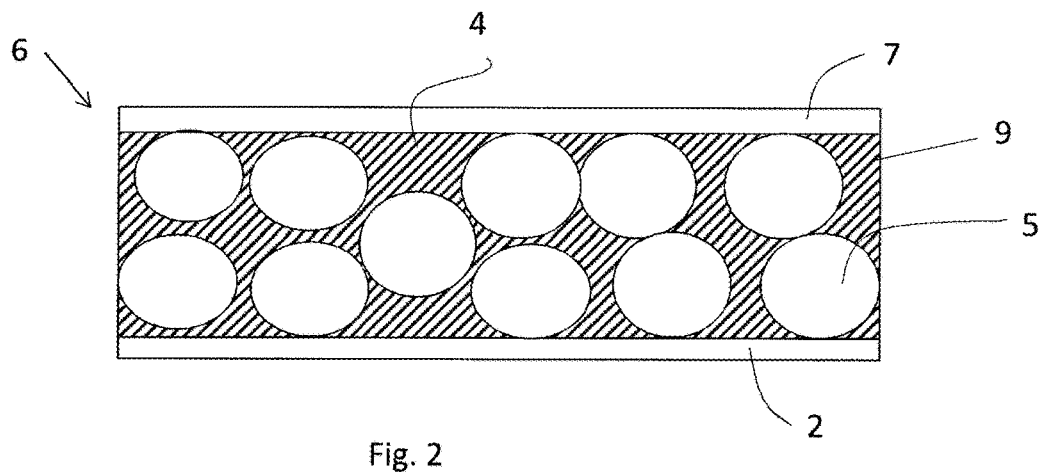
FIG. 2 is a schematic cross-sectional view of an expanded laminate structure of an embodiment of the invention.
Figure 3:
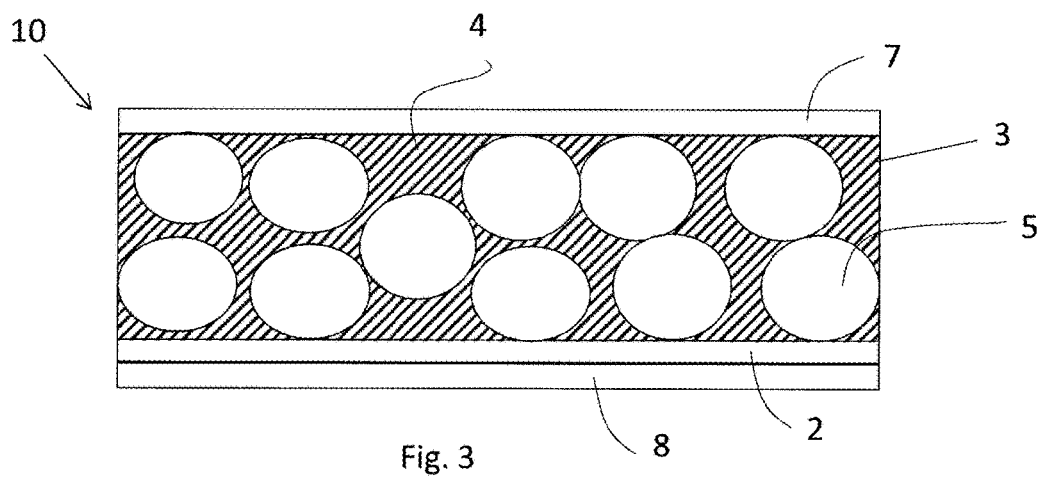
FIG. 3 is a schematic cross-sectional view of a liquid packaging board of an embodiment of the invention.

The products and processes of embodiments of the present invention are schematically illustrated in FIGS. 1-6. FIG. 1 shows an intermediate laminate product 1 of an embodiment of the invention, where a dry coating layer 3 is applied to a first paper layer 2. The coating layer includes a matrix 4 of binding components and unexpanded expandable microspheres 5. FIG. 2 shows an expanded laminate structure 6 of an embodiment of the invention, made from the intermediate laminate product 1 of FIG. 1. In the expanded laminate structure 6, a second paper layer 7 has been laminated to the coating layer of intermediate laminate product, so that the coating layer now forms an intermediate layer 9 and where the microspheres 5 are in expanded form and the matrix 4 of binding components binds the microspheres in the intermediate layer 9 and binds to the first and second paper layers. FIG. 3 shows a liquid packaging board 10 of an embodiment of the invention, which includes an expanded laminate structure 6, as shown in FIG. 2, and further including a liquid barrier layer 8 applied to the first paper layer 2. As said above liquid barrier layer could also be applied to the second paper layer 7 if desired.

Figure 4:
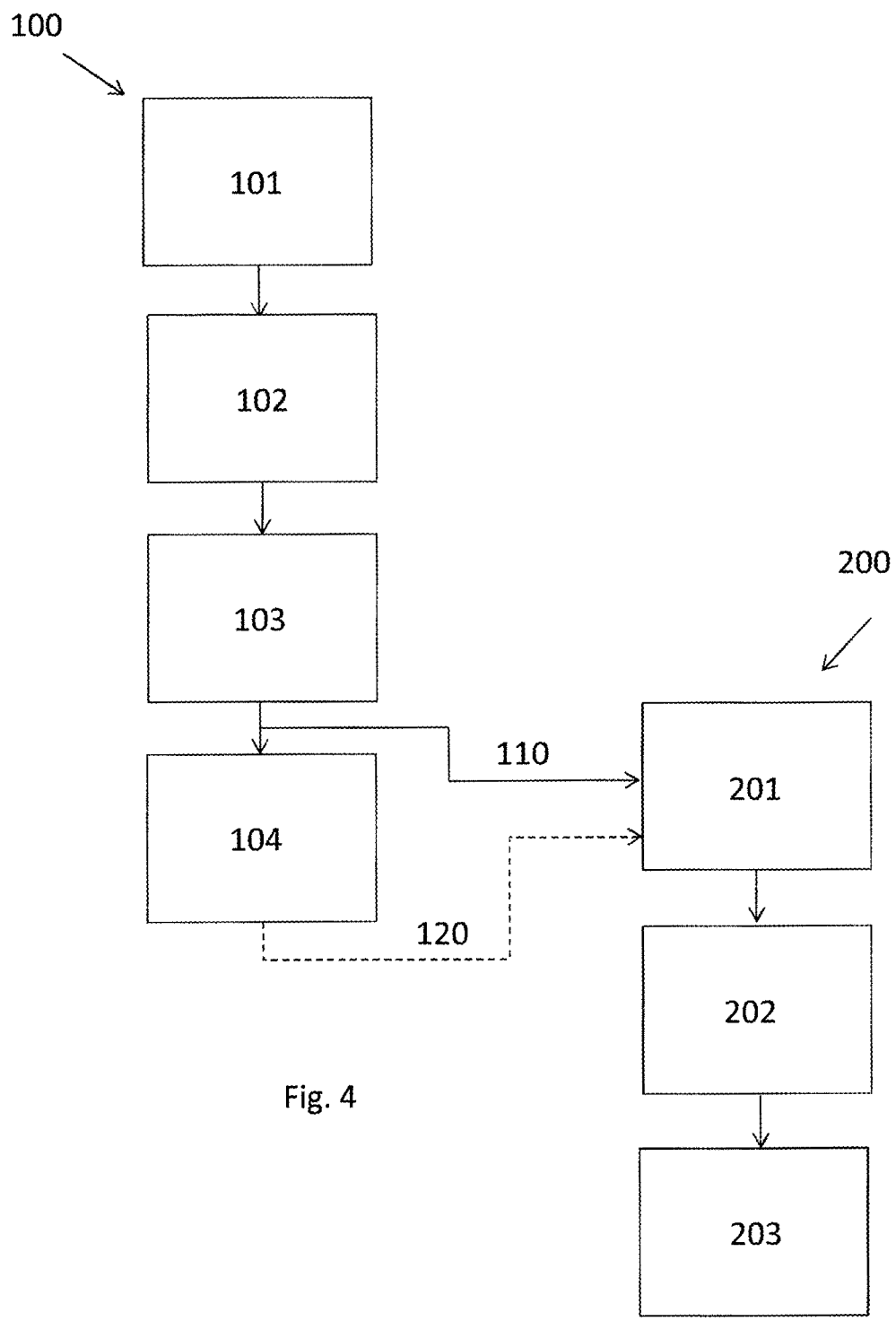
FIG. 4 is a schematic flow scheme of a process for forming an intermediate laminate product and an expanded laminate structure.

FIG. 4 is a schematic flow scheme of a process for forming an intermediate laminate product and an expanded laminate structure. On the left hand side of FIG. 4, a process 100 for forming the intermediate laminate product of FIG. 1 is illustrated. A first paper layer is introduced 101 into a coating equipment, and a coating including binding components and unexpanded expandable microspheres is applied 102 to the first paper layer, the coated paper layer is dried 103 at a first temperature ($T_1$) below the expansion temperature ($T_E$) of the microspheres, whereby a dry intermediate laminate product is obtained. The dry intermediate laminate product is packed 104 for transport or storage 120, or transferred directly 110 to a lamination step for lamination with a second paper layer. On the right hand side of FIG. 4, a process 200 for forming the intermediate laminate product of FIG. 1 is illustrated. The dry intermediate laminate product and a second paper layer are introduced 201 into a lamination equipment, where the second paper layer is heat laminated 202 to the dry coating layer of the intermediate laminate product, at a second temperature ($T_2$), which is above the expansion temperature ($T_E$) of the microspheres, whereby the microspheres expand and the binding components of the coating layer forms a thermoplastic blend, as discussed above. The expanded laminate obtained is packed 203 for transport or storage.

Figure 5:
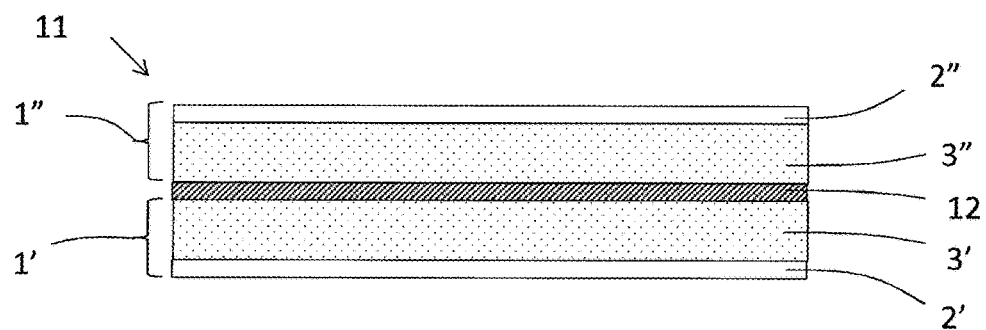
FIG. 5 is a schematic cross-sectional view of an alternative expanded laminate structure of an embodiment of the invention.

FIG. 5 shows an expanded laminate structure 11 of an embodiment of the invention, made from the intermediate laminate product 1 of FIG. 1. In this case, the laminate includes a barrier layer 12 positioned between two layers of the above described intermediate laminate product. A first layer 1' of intermediate laminate product includes a first paper layer 2' and a first expanded coating 3', and a second layer 1" of intermediate laminate product includes a second paper layer 2" and a second expanded coating 3". The barrier layer is applied between the first expanded coating 3' and the second expanded coating 3". As said above the barrier layer may be of plastic or metal sheet material, and, in particular embodiments, has oxygen-barrier properties.

Figure 6:
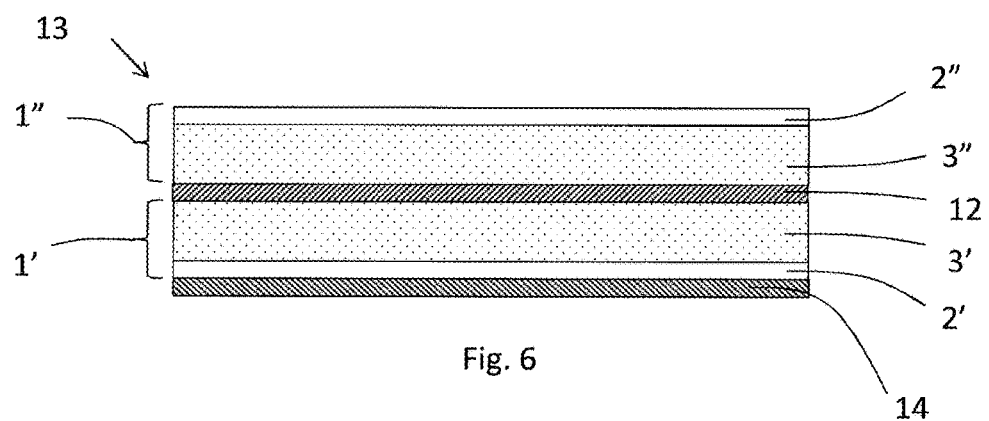
FIG. 6 is a schematic cross-sectional view of an additional alternative expanded laminate structure of an embodiment of the invention.

FIG. 6 shows an expanded laminate structure 13 of an embodiment of the invention. This expanded laminate structure includes the same components as the laminate structure of FIG. 5, and additionally includes a liquid barrier layer 14 positioned on the paper layer 2' on the outward side, facing away from the coating layer 3'.

EXAMPLES

Four different coating pastes were prepared and were used in laminates, which were evaluated with regard to lamination result and mechanical properties of the laminates.

Example 1. Preparation of Coating Paste According to an Embodiment of the Invention 270 g starch, Solcoat 55 from Solam GmbH, was mixed with 165 g water, cooked for about 1 h and then kept at a temperature of about 60° C. To the viscous starch was added 30 g expandable microspheres of the grade Expancel 909 DU 80 produced by the company Expancel. The paste was thoroughly mixed and then added 35.4 g glycerol, concentration 85%, pro analysis from WVR and 30.1 g urea, purity >99% from Fischer Chemicals. After thorough mixing the paste was stored at a 60° C. in a closed vessel to avoid evaporation of water. Directly before coating, the paste was mixed with 36.7 g water in order to make its viscosity more suitable for paper coating.

Example 2. Preparation of Coating Paste According to an Embodiment of the Invention 270 g starch, Solcoat 55 from Solam GmbH, was mixed with 165 g water, cooked for about 1 h and then kept at a temperature of about 60° C. To the viscous starch was added 30 g expandable microspheres of the grade Expancel 909 DU 80 produced by the company Expancel. The paste was thoroughly mixed and then added 35.4 g glycerol, concentration 85%, pro analysis from WVR, 30.1 g urea, purity >99% from Fischer Chemicals and 60.2 g styrene-butadiene latex of the grade EPL-9272 from EKA Synthomer Oy. The concentration of the latex dispersion was 50%. After thorough mixing the paste was stored at a 60° C. in a closed vessel to avoid evaporation of water. Directly before coating, the paste was mixed with 23.9 g water in order to make its viscosity more suitable for paper coating.

Example 3. Preparation of Coating Paste. Comparative Example 270 g starch, Solcoat 55 from Solam gmbH, was mixed with 165 g water, cooked for about 1 h and then kept at a temperature of about 60° C. To the viscous starch was added 30 g expandable microspheres of the grade Expancel 909 DU 80 produced by the company Expancel. After thorough mixing the paste was stored at a 60° C. in a closed vessel to avoid evaporation of water. Directly before coating, the paste was mixed with 7.4 g water in order to make its viscosity more suitable for paper coating.

Example 4. Preparation of Coating Paste. Comparative Example 540 g styrene-butadiene latex of the grade EPL-9272 with the concentration 50% from EKA Synthomer Oy was added 30 g expandable microspheres of the grade Expancel 909 DU 80 produced by the company Expancel. The coating paste was kept at room temperature in a closed vessel and heated to 60° C. directly before paper coating.

The coating paste compositions of Examples 1-4 are summarized in the Table 1.

TABLE 1

| Coating paste | Starch (g) | Microspheres (g) | Urea (g) | Glycerol (g) | Latex (g) conc. 50% |
|---|---|---|---|---|---|
| Ex. 1 | 270 | 30 | 30.1 | 35.4 | — |
| Ex. 2 | 270 | 30 | 30.1 | 35.4 | 60.2 |
| Ex. 3 (Comp.) | 270 | 30 | 30.1 | 35.4 | — |
| Ex. 4 (Comp.) | — | 30 | 30.1 | 35.4 | 540 |

Example 5. Coating of Paper with Pastes Prepared According to Example 1-4

Kraftliner with a basis weight of 100 g/m² produced at SCA Obbola Mill was coated with the pastes prepared according to Example 1-4. A laboratory bench rod coater, RK 202 Control Coater from RK Printcoat Instruments, Litlington, United Kingdom, was used to accomplish the paper coating. A smooth rod without ripples was used in this Example and the coating speed setting was 6. The paper size was A3.

The coated paper was dried at about 60° C. in an oven. During this step, the paper was held by a frame in order to prevent curl formation. The paper thickness and basis weight were determined according to the method described in the ISO standard method no. 5270.

In table 2, the measured basis weight and thickness for uncoated and coated paper are shown. The calculated basis weight and thickness for the coating layer is achieved by subtracting the value of the uncoated paper from the coated paper.

TABLE 2

| Sample | Coated Paper | Paper thickness (µm) | Paper basis weight (g/m²) | Coating layer thickness (µm) | Coating layer basis weight (g/m²) |
|---|---|---|---|---|---|
| 0 | Uncoated | 132 | 100 | — | — |
| 1 | Coated with paste Ex. 1 | 230 | 231 | 98 | 131 |
| 2 | Coated with paste Ex. 2 | 182 | 182 | 50 | 82 |
| 3 (Comp.) | Coated with paste Ex. 3 | 193 | 179 | 61 | 79 |
| 4 (Comp.) | Coated with paste Ex. 4 | 153 | 124 | 21 | 24 |

Example 6. Heat Expansion of Coated Papers Prepared According to Example 5

The coated papers from Example 5 were heated in an oven for 10 minutes at 160° C. The thickness of the heat-treated papers was then determined according to the method described in the ISO standard method no. 5270.

In table 3, the thickness for heat-treated paper is shown and the thickness of the coating layer is calculated by subtracting the thickness of the heat-treated uncoated paper from the thickness of the heat-treated coated papers.

TABLE 3

| Sample | Coated paper thickness (µm) after heat treatment | Coating layer thickness (µm) after heat treatment |
|---|---|---|
| 0 | 132 | — |
| 1 | 728 | 596 |
| 2 | 373 | 241 |
| 3 (Comp.) | 201 | 69 |
| 4 (Comp.) | 221 | 89 |

By comparing the calculated coating layer thickness values before and after heat treatment the expansion in percent can be calculated and this is shown in table 4.

TABLE 4

| | Coating layer thickness (µm) | | |
|---|---|---|---|
| Sample | before heat treatment | after heat treatment | thickness expansion (%) |
| 1 | 98 | 596 | 508 |
| 2 | 50 | 241 | 382 |
| 3 | 61 | 69 | 13 |
| 4 | 21 | 89 | 324 |

This Example shows that the coating layers achieved from pastes prepared according to Example 1 and 2 (according to the invention) expands much more than coating layers achieved from Example 3 (comparative Example, not according to the invention).

Example 7. Lamination of Coated Papers Prepared According to Example 5

In this investigation, the coated papers from Example 5 were laminated with uncoated kraftliner, 100 g/m² produced at SCA Obbola Mill. A coated paper was placed with the coated side on an uncoated paper and then the two sheets were run through an office lamination machine, Ibico Pouch Laminator, type IL-1.2HR delivered by Flexima AB, Eskilstuna, Sweden. The sheets were run through this machine at the lowest possible speed, setting 1 (about 0.19 m/min) and a temperature of 160° C. After passage through the laminating machine the materials were inspected. The result is shown in table 5.

TABLE 5

| Sample | Lamination result |
|---|---|
| 1 | Excellent result. A laminate with very good adhesion between the different layers and an expanded middle layer was achieved. |
| 2 | Excellent result. A laminate with very good adhesion between the different layers and an expanded middle layer was achieved. |
| 3 (comp.) | No lamination. Two separate paper sheets with no adhesion were achieved |
| 4 (comp.) | No lamination. Two separate paper sheets with no adhesion were achieved |

This Example shows that papers coated with the pastes prepared according to Example 1 and 2 (according to the invention) after passage through a lamination machine are well laminated to uncoated paper while papers coated with pastes according to Example 3 and 4 (comparative Examples, not according to the invention) do not bind to uncoated paper.

To sum up Example 5 and 6 it can be concluded that paper with expandable coating both can be expanded and laminated. Paper coated with expandable microspheres and starch without plasticizing agents can neither be expanded nor laminated. Papers coated with a mixture of expandable microspheres and latex without starch may be expanded but may not be laminated.

Example 8. Preparation of Laminates According to the Invention

In this Example kraftliner with the basis weight 100 g/m², produced at SCA Obbola Mill, was coated according to the same method as described in Example 5. Papers with different amount of expandable coating were prepared by using rods with different ripples.

The coating paste was prepared by first mixing 270 g starch, Solcoat 55 from Solam gmbH, with 165 g water, cooking for about 1 h and then keeping the cooked starch at a temperature of about 60° C. To the viscous starch was added 36 g expandable microspheres of the grade Expancel 909 DU 80 produced by the company Expancel. The paste was thoroughly mixed and then added 35.4 g glycerol, concentration 85%, pro analysis from WVR, 30.1 g urea, purity >99% from Fischer Chemicals and 60.2 g styrene-butadiene latex of the grade EPL-9272 from EKA Synthomer Oy. The concentration of the latex dispersion was 50%. After thorough mixing the paste was stored at a 60° C. in a closed vessel to avoid evaporation of water. Directly before coating, the paste was mixed with 27.4 g water in order to make its viscosity more suitable for paper coating.

The coated papers were laminated with three different paper grades according to the lamination procedure shown in Example 6. The paper grades were the ones shown in Table 6.

TABLE 6

| Paper grade | Description | Producer | Basis weight (g/m²) |
| --- | --- | --- | --- |
| Kraftliner | Strong paper based on unbleached kraft pulp. Used for production of corrugated board | SCA Obbola | 100 |
| Puro Performance | Packaging paper based on thermo-mechanical pulp and bleached kraft pulp | SCA Ortviken | 80 |
| GraphoCote | Pigment-coated publication paper based on thermomechanical pulp and bleached kraft pulp for use in magazines | SCA Ortviken | 80 |

All laminations worked very well and expanded laminates with excellent adhesion between the layers were prepared. This Example shows that papers coated with an expandable coating layer according to the invention can be laminated to paper grades of different types. The layers of the prepared laminates (A-C) are described in table 7.

TABLE 7

| Laminate | Layers | Basis weight (g/m²) | Thickness (µm) |
| --- | --- | --- | --- |
| A | Kraftliner | 100 | 132 |
|   | Expanded coating | 25 | 228 |
|   | Kraftliner | 100 | 132 |
| B | Kraftliner | 100 | 132 |
|   | Expanded coating | 48 | 641 |
|   | Puro Performance | 80 | 101 |

TABLE 7-continued

| Laminate | Layers | Basis weight (g/m²) | Thickness (µm) |
| --- | --- | --- | --- |
| C | Kraftliner | 100 | 132 |
|   | Expanded coating | 44 | 436 |
|   | GraphoCote | 80 | 68 |

The basis weights and the thickness values of the expanded coating layers were calculated by measuring the laminates and subtract the contribution of the paper layers to the basis weights and thickness values of the laminates. Thickness and basis weights of papers and laminates were measured according to the methods described in the ISO standard method no. 5270.

Example 9. Characterization of Mechanical Properties of Laminates Prepared According to Example 8

Some important mechanical properties of the laminates prepared in Example 8 were characterized. The used standard methods are shown in table 8.

TABLE 8

| Property | Method |
| --- | --- |
| Basis weight | ISO 5270 |
| Thickness | ISO 5270 |
| Density | ISO 5270 |
| Tensile stiffness index MD | ISO 1924-3 |
| Tensile stiffness index CD | ISO 1924-3 |
| Tensile energy absorption MD | ISO 1924-3 |
| Tensile energy absorption CD | ISO 1924-3 |
| Tensile strength index MD | ISO 1924-3 |
| Tensile strength index CD | ISO 1924-3 |
| Strain at break CD | ISO 1924-3 |
| Strain at break MD | ISO 1924-3 |
| Tensile energy absorption index MD | ISO 1924-3 |
| Tensile energy absorption index CD | ISO 1924-3 |
| Elasticity modulus MD | ISO 1924-3 |
| Elasticity modulus CD | ISO 1924-3 |
| Bending stiffness CD | ISO 5628: two point |
| Bending stiffness MD | ISO 5628: two point |
| Z-strength | ISO 15754 |

For comparison, two available paper board grades were included in the investigation. These samples are named D and E. Sample D is a pigment-coated paperboard useful for production of packages, which consists of three fibre layers, a bottom layer of bleached softwood kraft pulp, a middle layer of softwood chemithermomechanical pulp with some bleached softwood and hardwood kraft pulp and a top layer made from a mixture of bleached hardwood kraft pulp (about 69%) and bleached softwood kraft pulp (about 31%). The top layer has a coating which contains both calcium carbonate and kaolin. Sample E is a liquid packaging board useful for production of liquid packages, which consists of three fibre layers and has no coating. The bottom layer consists of unbleached softwood kraft pulp. The middle layer is a mixture of softwood chemithermomechanical pulp (about 76%), softwood kraft pulp (about 19%) and some hardwood kraft pulp (about 5%). The top layer consists of bleached hard wood kraft pulp with a small content of bleached softwood kraft pulp. The results obtained from the investigation are shown in table 9.

TABLE 9

| Property | Laminate A | Laminate B | Laminate C | Paperboard D | Liquid packaging board E |
|---|---|---|---|---|---|
| Basis weight (g/m$^2$) | 225 | 228 | 224 | 292 | 247 |
| Thickness (μm) | 492 | 872 | 636 | 484 | 384 |
| Density (kg/m$^3$) | 457 | 261 | 352 | 605 | 643 |
| Tensile strength index (kNm/kg) | 74.0 | 47.9 | 46.7 | 37.3 | 65.2 |
| Tensile stiffness index (MNm/kg) | 5.97 | 4.96 | 4.48 | 4.48 | 6.4 |
| Tensile energy absorption index (J/kg) | 1483 | 530 | 938 | 566 | 1302 |
| Strain at break (%) | 3.1 | 1.8 | 3.0 | 2.2 | 2.9 |
| Z-strength (kN/m$^2$) | 590 | 407 | 488 | 306 | 580 |
| Bending stiffness (mNm) | 32.8 | 75.2 | 39.5 | 29.9 | 24.2 |

For tensile strength index, tensile stiffness index, tensile energy absorption index, strain at break and bending stiffness, the reported values are the geometrical average from measurements in the paper machine direction (MD) and cross direction (CD).

The Example shows that the laminates prepared according to the invention is at the same level or better than conventional paper board regarding several mechanical properties.

Example 10. Preparation of Laminates Containing an Oxygen-Barrier Film

Kraftliner with a basis weight of 100 g/m$^2$ was coated with the expandable coating as described in Example 8 and achieved a basis weight of 146 g/m$^2$. This means that the expandable coating layer had a basis weight of 46 g/m$^2$. An aluminum film from CeDo gmbH, Monchengladbach, Germany, with the basis weight 30.8 g/m$^2$ and the thickness 11 μm was placed between two sheets of kraftliner with expandable coating layers on each side of the aluminum film. The paper sheets and the aluminum film were then run through a lamination machine as described in Example 6. An expanded laminate with excellent adhesion between the different layers was achieved. The cross-section of the laminate can be as schematically described by FIG. 5.

This Example shows that the expandable coating has an excellent adhesion to aluminum and as aluminum films are known to be good oxygen barrier this Example shows that laminates can be produced with good oxygen-barrier properties. The expanded coating has in this Example not only the function of giving the laminate thickness and bending stiffness but also to fixate the aluminum film.

Example 11. Preparation of Laminate Containing Both an Oxygen Barrier Film and a Liquid Barrier Film Kraftliner with a basis weight of 100 g/m$^2$ was coated with the expandable coating as described in Example 8 and achieved a basis weight of 146 g/m$^2$. This means that the expandable coating layer had a basis weight of 46 g/m$^2$. A polyethylene-vinylalcohol film, EVAL™, with the basis weight 20 g/m$^2$ and the thickness 15 μm from the company Kurrarary was placed between two sheets of kraftliner with expandable coating layers on each side of the polyethylene-vinyl alcohol film. The paper sheets and the polyethylene-vinylalcohol film were then run through a lamination machine as described in Example 6. An expanded laminate with excellent adhesion between the different layers was achieved. The expanded laminate was then placed on a polyethylene film with the basis weight 135 g/m$^2$, achieved from Wemaco AB, Bottnaryd, Sweden. The expanded laminate and the polyethylene film were then run through a lamination machine as described in Example 6. A laminate with excellent adhesion between the different layers was achieved. The cross-section of the laminate can be as schematically described by FIG. 6.

The Example shows that papers with expandable coatings according to the invention can be laminated to polyethylene-vinylalcohol films and that the resulting laminates can be laminated with polyethylene film. As polyethylene-vinylalcohol films are known to be good oxygen barriers and polyethylene films are known to be good barriers against water and moisture, the laminate in shown FIG. 6 has good barrier properties both against water and moisture as well as oxygen.

The invention claimed is:

1. An intermediate laminate product, comprising a first paper layer comprising lignocellulose fibres, and a dry coating layer applied to one surface of the first paper layer, wherein the dry coating comprises:
   2-50 wt-% of expandable microspheres based on the dry weight of the dry coating, said microspheres having an expansion temperature ($T_E$) of 120-230° C.,
   30-93 wt-% of at least one polysaccharide, based on the dry weight of the dry coating, wherein the polysaccharide is a native or modified starch, and
   5-30 wt-% of a plasticizing additive for forming a thermoplastic blend with the polysaccharide, based on the dry weight of the dry coating, and
   wherein the dry coating is applied in an amount of 5-299 g/m$^2$.

2. The intermediate laminate product of claim 1, wherein the polysaccharide is a modified starch having reduced viscosity after gelatinisation as compared to native starch.

3. The intermediate laminate product of claim 1, wherein the plasticizing additive is chosen from the group consisting of urea, glycerol, citric acid, formamide, acetamide, sorbitol, and glycol, combinations thereof.

4. The intermediate laminate product of claim 1, wherein the dry coating further comprises 1-25 wt-% of one or more polymer compounds, based on the dry weight of the dry coating.

5. The intermediate laminate product of claim 1, wherein the dry coating comprises 5-30 wt-% of the expandable microspheres, based on the dry weight of the dry coating.

6. The intermediate laminate product of claim 1, wherein the dry coating comprises, based on the dry weight of the dry coating, 7-20 wt-% of the expandable microspheres, 40-75 wt-% of starch as the polysaccharide, the plasticizing additive as a combination of 5-10 wt-% of urea and 5-10 wt-% of glycerol, and 5-20 wt-% of polymer compounds.

7. An expanded laminate structure comprising:
   the intermediate laminate product of claim 2, and
   a second paper layer comprising lignocellulose fibres, wherein the dry coating layer is in expanded form, and the second paper layer has been attached to the dry coating by heat lamination.

8. A liquid packaging board comprising:
   the expanded laminate structure of claim 7, and
   a liquid barrier layer on at least one of said first or second paper layers.

9. A process, comprising:
applying a coating in an amount of 5-299 g/m² to a first paper layer to form a coated paper layer, wherein the coating comprises an aqueous mixture of:
30-93 wt-% of at least one polysaccharide, based on the dry weight of the coating, wherein the polysaccharide is a native or modified starch,
5-30 wt-% of a plasticizing additive for forming a thermoplastic blend with the polysaccharide, based on the dry weight of the coating, and
2-50 wt-% expandable microspheres based on the dry weight of the coating, said microspheres having an expansion temperature ($T_E$) of 120-230° C., and optionally a latex dispersion;
drying the coated paper layer at a first temperature ($T_1$) below the expansion temperature ($T_E$) of the microspheres, wherein said first temperature ($T_1$) is 80-110° C., whereby a dry intermediate laminate product is obtained;
packing the dry intermediate laminate product for transport or storage, or transferring it directly to a lamination step for lamination with a second paper layer.

10. A process, comprising the process of claim 9, and further comprising:
introducing the intermediate laminate product into a heat lamination step;
applying a second paper layer to the coating of the intermediate product at a second temperature ($T_2$), which is above the expansion temperature ($T_E$) of the microspheres,
whereby the microspheres expand, and at which the plasticizing additive causes plasticizing of the polysaccharide, to form a thermoplastic blend.

11. The process of claim 10, wherein said second temperature ($T_2$) is 120-200° C.

12. An expanded laminate structure comprising:
two layers of the intermediate laminate product of claim 1, and
a barrier layer of plastic or metal sheet material positioned between the two layers of intermediate laminate product, in which the coating layers are in expanded form,
wherein the two layers of intermediate laminate product are oriented in the laminate such that the expanded coating of each layer is turned towards the barrier layer.

13. The expanded laminate structure of claim 12, wherein the barrier layer is made from an oxygen-barrier material.

14. The expanded laminate structure of claim 12, further comprising a liquid barrier layer on at least one of said first or second paper layers, on the side of the second paper layer facing away from the coating layer.

15. A process comprising the process of claim 9 to form two intermediate laminate products, and further comprising:
introducing a first of the intermediate laminate products into a heat lamination step;
applying a barrier layer of plastic or metal sheet material to the coating of the first of the intermediate laminate products;
applying a second of the intermediate laminate products to the barrier layer, such that the coating layer of the second of the intermediate laminate products is turned towards the barrier layer; and
subjecting said barrier layer to a second temperature ($T_2$), which is above the expansion temperature ($T_E$) of the microspheres, whereby the microspheres expand, and at which the plasticizing additive causes plasticizing of the polysaccharide, to form thermoplastic blend.

16. A method comprising using the expanded laminate structure of claim 7 as a packaging board to form a package.

17. The intermediate laminate product of claim 4, wherein said polymer compounds are selected from the group consisting of styrene-butadiene polymers, acrylonitrile-butadiene polymers, vinyl acetate-ethylene polymers, styrene-butylacrylate polymers, polyvinyl-acetate polymers, polyhydroxy alkanoate polymers, nitrile polymers, and natural rubber.

18. A process comprising:
providing a previously manufactured intermediate laminate product according to claim 1;
introducing the intermediate laminate product into a heat lamination step;
applying a second paper layer to the coating of the intermediate product at a second temperature ($T_2$), which is above the expansion temperature ($T_E$) of the microspheres,
whereby the microspheres expand, and at which the plasticizing additive causes plasticizing of the polysaccharide, to form a thermoplastic blend.

19. The expanded laminate structure of claim 12, wherein the barrier layer comprises polyethylene-vinylalcohol film or aluminium film.

20. A process comprising:
providing two previously manufactured intermediate laminates according to claim 1;
introducing a first of the intermediate laminate products into a heat lamination step;
applying a barrier layer of plastic or metal sheet material to the coating of the first of the intermediate laminate products;
applying a second of the intermediate laminate products to the barrier layer, such that the coating layer of the second of the intermediate laminate products is turned towards the barrier layer; and
subjecting said barrier layer to a second temperature ($T_2$), which is above the expansion temperature ($T_E$) of the microspheres, whereby the microspheres expand, and at which the plasticizing additive causes plasticizing of the polysaccharide, to form thermoplastic blend.

* * * * *